April 15, 1930.   F. FENTON   1,754,993
METHOD OF AND APPARATUS FOR SIZING HARD RUBBER ARTICLES
Filed Sept. 7, 1928
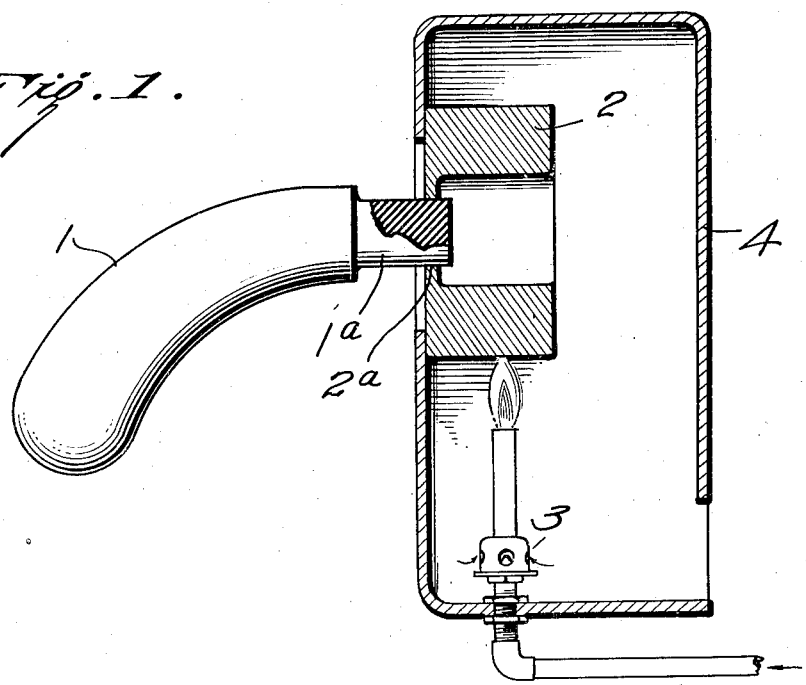
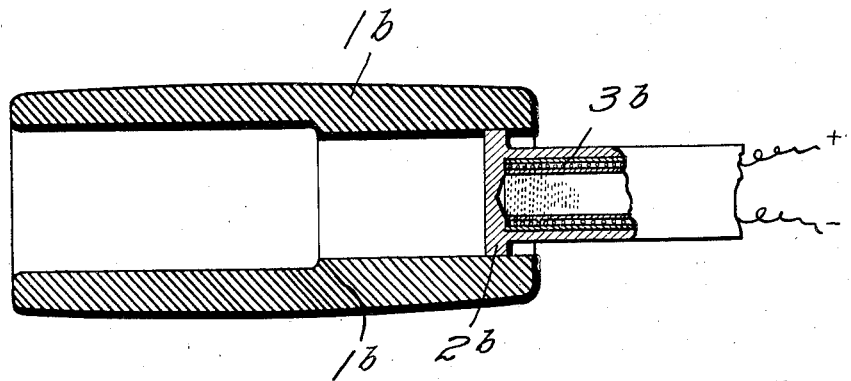
Inventor
FRANK FENTON,
By Spear, Middleton, Donaldson & Hall
Attorneys Patented Apr. 15, 1930

1,754,993

UNITED STATES PATENT OFFICE

FRANK FENTON, OF AKRON, OHIO, ASSIGNOR TO THE MILLER RUBBER COMPANY, OF AKRON, OHIO, A CORPORATION OF OHIO

METHOD OF AND APPARATUS FOR SIZING HARD-RUBBER ARTICLES

Application filed September 7, 1928. Serial No. 304,528.

My invention relates to an improved method of shaping or sizing hard rubber articles to the exact size of members with which they are designed to telescopically engage with a snug or tight fit, and to apparatus for carrying out said method.

The invention is particularly designed for fitting hard rubber hand grips or handles to parts or members on which such handles are desirable, such for example as the hard rubber handles of vacuum cleaners, where a metal tube is employed as the means for pushing the cleaner, which it is desired shall be provided with a hard rubber and non-conducting hand grip portion. Usually such hand grip portions or handles are provided with a reduced cylindrical extension which is telescopically inserted in the end of the tube and should fit therein sufficiently snug or tight to be retained by friction.

It has been found difficult and in fact impracticable to mold these handles so as to secure the requisite fit, and difficult and expensive to machine them after they have been molded into a complete vulcanized hard rubber article.

I have discovered that if such a vulcanized hard rubber article, molded to slightly oversize, is caused to progressively contact with a narrow edged die heated to a temperature sufficient to burn off the surface rubber, the latter will be removed without injury to the underlying rubber, and the result will be a handle having a part for telescopingly fitting the carrying member with the requisite accurate fit, and my invention includes this novel process and apparatus for performing the same, as hereinafter more specifically set forth and defined by the appended claims.

In order that the invention may be better understood, reference is made to the accompanying drawings, in which:

Figure 1 is a sectional elevation, largely of a diagrammatic nature, illustrating my novel apparatus, and Fig. 2 is a similar view showing a modification.

Referring by reference characters to this drawing, the numeral 1 designates a hard rubber handle having a reduced extension $1^a$ which is to be sized or reduced to accurately fit the tubular sweeper shaft (not shown), such handle having been molded or produced by the ordinary or any desired method, with its portion $1^a$ slightly oversize.

2 designates a metal sizing die having an opening $2^a$ of a size or diameter corresponding exactly to the interior of the tubular sweeper shaft, the die being so formed that it has a relatively narrow edge so that only a small amount of metal will contact with the rubber. 3 designates means for heating the die, which as an example is shown as a gas burner. 4 designates a protecting hood or enclosure for the burner or die.

In operation the die is brought to the requisite temperature and the portion $1^a$ of the hard rubber handle pushed axially into the die and then quickly withdrawn. During its entrance the surface rubber is burned by the heated die and burned particles pushed aside and on withdrawing the handle the end will be found to be of the exact size required and all inequalities in its surface removed, leaving it truly cylindrical.

As the die expands slightly in heating, its die opening should be such that when heated its opening is of the desired size.

It is obvious that by making the die with an external flange $2^b$, as shown in Fig. 2, it may be used for correspondingly sizing the tubular opening of a handle of the sleeve type, as indicated at $1^b$, and this die may, if desired, be equipped with an electric heater. Obviously the handle can be held stationary, if desired, and the die moved.

While I have described the invention in connection with rubber handles, it is not thus limited, and is applicable to a large variety of articles.

I claim:

1. A die for shaping hard rubber articles comprising a hollow body having a relatively narrow inwardly directed contact edge of the desired configuration, and means for heating said edge to a rubber burning temperature.

2. A die for shaping hard rubber articles comprising a cylindric body having a narrow circumferential flange and means for heating said die to a rubber burning temperature.

3. Means for shaping hard rubber articles comprising a cylindrical member having at one side a narrow inwardly directed flange, and a gas burner arranged to direct a flame against said body.

4. Apparatus according to claim 3 provided with a casing enclosing the die and burner.

In testimony whereof, I affix my signature.

FRANK FENTON.